Figure 1:
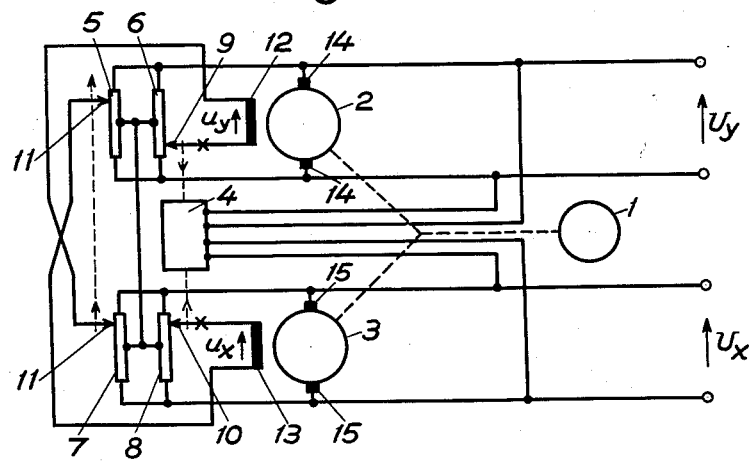

May 2, 1961 V. TÖRÖK 2,982,865
N-PHASE SELF-OSCILLATING LOW FREQUENCY GENERATOR
Filed April 2, 1959 2 Sheets-Sheet 1

INVENTOR.
VILMOS TÖRÖK.
BY
Attorney.

May 2, 1961   V. TÖRÖK   2,982,865
N-PHASE SELF-OSCILLATING LOW FREQUENCY GENERATOR
Filed April 2, 1959   2 Sheets-Sheet 2
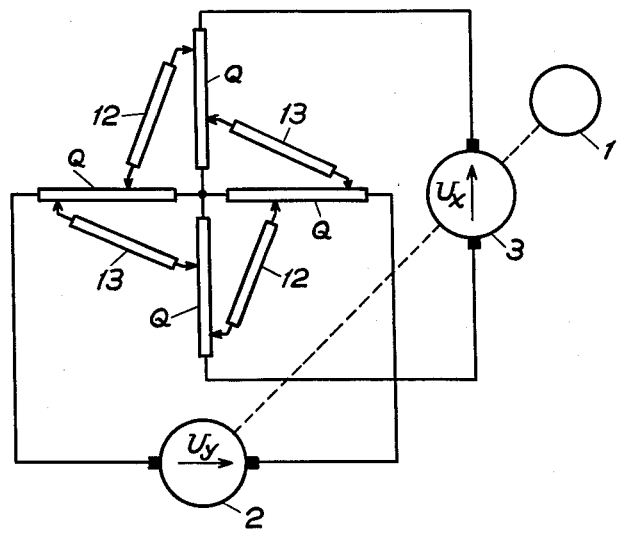
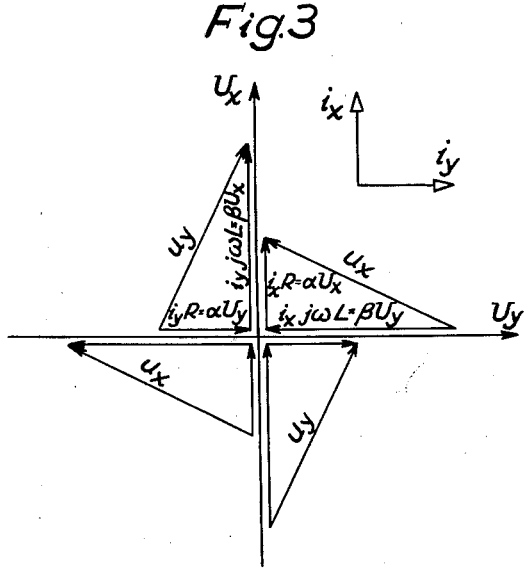
INVENTOR.
VILMOS TÖRÖK.
BY
Attorney.

United States Patent Office 2,982,865
Patented May 2, 1961

2,982,865

N-PHASE SELF-OSCILLATING LOW FREQUENCY GENERATOR

Vilmos Török, Vasteras, Sweden, assignor to Allmanna Svenska Elektriska Aktiebolaget, Vasteras, Sweden, a corporation of Sweden Filed Apr. 2, 1959, Ser. No. 803,779

Claims priority, application Sweden Apr. 9, 1958

4 Claims. (Cl. 307—57)

There is a great need for a simple, cheap and reliable self-oscillating generator for the control of electrical A.C. machines. This invention relates to an N-phase self-oscillating low frequency generator for such purposes. It is of great value, especially for driving paper machines and such, if one can switch from running the driving motors with direct current to alternating current because the A.C. equipment will be cheaper both to buy and to run. It is, however, a condition that the speed of the driving motors can be regulated within certain limits. This condition can be easily complied with by using synchronous motors, the magnetizing windings of these being coupled together in groups to low frequency generators. It has hitherto been difficult to effect such a change because stable, cheap and reliable self-oscillating generators for great powers have not been obtainable. It has been tried, however, to control rotating D.C. generators with a low-frequency alternating voltage which has been obtained mechanically. It has been tried, for example, to use a potentiometer, the movable contact of which was rotated. This did not fulfil the conditions of simplicity and reliability which are set by the paper industry. In addition to this, in order to be able to regulate the frequency of the alternating voltage, the number of revolutions of the potentiometer must be regulated, which means that a motor mechanically coupled to this must have a variable speed. This is in itself an additional complication.

It is also known, in order to obtain a low frequency three phase current, to allow two rotating direct current generators to be self magnetized to saturation and, by magnetization from the other machine, generate a low frequency two phase current which is supplied to the magnetizing windings of three other generators in order to obtain the mentioned three phase current. Machines of a special construction with three magnetizing windings, which are costly, were used in the self oscillating system. These machines cannot be loaded to any great extent due to the fact that they must be self magnetized to saturation, which makes it necessary to let these control three direct current generators, the output terminals of these being so coupled together that they constitute a three phase system.

The drawbacks mentioned above are avoided through the invention which is characterised in that N direct current amplifiers constitute an N-phase self-oscillating low frequency generator by supplying to the input terminals of each amplifier, over dividers, a part of the output of each amplifier for labile self-steering and a part of the output of at least one other amplifier for obtaining self-oscillations between the amplifiers, and that a sensing device which measures the vector sum of the output values is arranged to regulate the self-steering of the amplifiers for a constant output amplitude. The number of amplifiers is equal to the desired number of phases in the output so that the number of amplifiers relative to the earlier known devices has been considerably reduced. Through the labile self magnetizing, the generator can be loaded nearly to the rated power at constant output.

Figure 4:
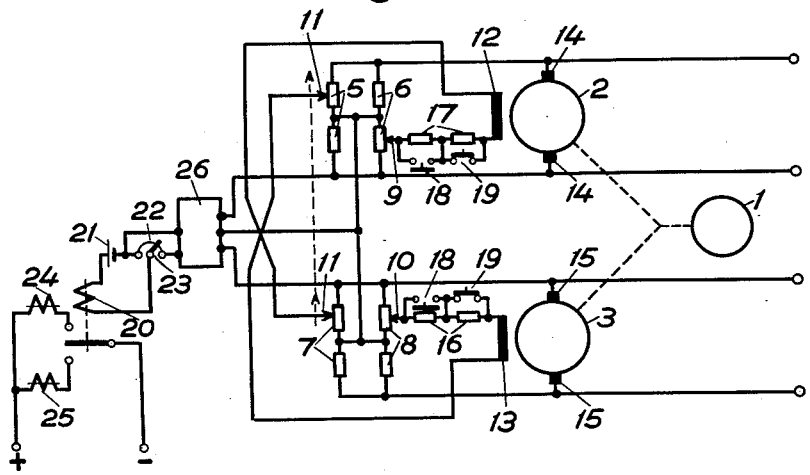

The invention will be described in the following with reference to the accompanying drawing in which Figure 1 shows the connection diagram of a two phase generator which consists of two direct current generators driven by a common motor. Figure 2 shows schematically a two phase generator according to Figure 1 and Figure 3 shows a vector diagram of the voltages which occur in the input and output of the generators. In Figure 4 is shown a variant of a two phase generator according to Figure 1.

In the Figures 1, 2, 3 and 4, 1 denotes a motor which drives two direct current generators 2 and 3 at a constant speed. 12 and 13 denote magnetizing windings for the generators 2 and 3 respectively. 14 and 15 denote brushes. 5, 6, 7 and 8 denote voltage dividers with movable contacts 11, 9 and 10. 4 denotes a voltage measuring device which measures the resultant of the output voltages $U_y$ and $U_x$ and acts upon the movable contacts 9 and 10 in case the voltage is not of the correct value. The output voltage of the generator is changed by moving the movable contacts 9 and 10 on the voltage dividers 6 and 8 respectively while the frequency of the generator is changed by moving the gliding contacts 11 on the voltage dividers 5 and 7.

The operation of the generator will be described with reference to Figures 2 and 3 of the drawings. In Figure 2 is shown schematically the magnetizing device for the two phase generator shown in Figure 1, and Figure 3 shows in vector form the voltages which are present in the input and output of the generators.

Suppose that the rotor voltages of the generators 3 and 2 are $$U_x = U \cos \omega t$$
$$U_y = U \sin \omega t \quad (1)$$

where $U$=voltage amplitude and $\omega$=the angular frequency of the two phase voltage.

The magnetizing currents of the different generators are assumed to be proportional to the respective voltages $$i_x = cU \cos \omega t$$
$$i_y = cU \sin \omega t \quad (2)$$

where $i_x$, $i_y$=the magnetizing currents in the generators 3 and 2 respectively and $c$= a constant.

The necessary magnetizing voltages will be, due to the magnetizing circuits of the generators being ohmic-inductive $$u_x = Ri_x + L(di_x/dt)$$
$$u_y = Ri_y + L(di_y/dt) \quad (3)$$

where $R$=the resistance in each magnetizing circuit and $L$=the inductivity in each magnetizing circuit.

The Equations 1, 2 and 3 give together $$u_x = i_x R - i_y \omega L \quad (4a)$$
$$u_y = i_y R + i_x \omega L \quad (4b)$$

It is apparent from the Equations 4a and 4b that the necessary magnetizing voltages for self-oscillations can be put together from the two generator voltages by means of simple voltage dividers. The first part of the expressions on the right hand side of the sign of equality in the expressions 4a and 4b represent the voltages which make the generators labile self-magnetized as direct current generators while the other parts represent the additional voltages which drive the magnetizing around cyclically.

Figure 3 shows that the voltages which are necessary to keep up the self-oscillations can be obtained when the amplifiers are coupled as shown in Figure 2, i.e. that a component to the input of each amplifier is obtained from the output of the amplifier and that another component is obtained from the output of the other amplifier. Q denotes in Figure 2 voltage dividers.

The two phase generator shown in Figure 2 is different from that in Figure 1 in that the substituent control for action of the movable contacts has been substituted by a regulating system which consists of the resistors 16 and 17 which are short-circuited by the contacts 18 and 19 controlled by a balancing relay 20 which is connected to a voltage sensing device 26. The resistances 16 and 17 are divided into two parts in such a way that if one half of the resistance 16 and 17 is short circuited through the contacts 19, then the output voltage of the generators will be constant. The voltage will, however, seldom be constant for long periods of time because of the generator being self-magnetized so that the contacts 19 will open by an increase in voltage in order to reduce the voltage to the normal value. On the contrary, if the voltage falls, then the contacts 18 will be closed so that the self-magnetizing will again magnetize the generators to the desired voltage. 24 and 25 denote relay coils which actuate the contacts 19 and 18. 21 denotes a battery for a reference voltage, and 22 a potentiometer with a movable contact 23 for adjusting the voltage by which the relays 24 and 25 shall work.

The examples of the invention shown in the drawings are especially advantageous embodiments of a two phase generator, but many differing embodiments can be made within the scope of the invention. The direct current generators can, for example, be substituted by any kind of direct current amplifiers such as transductors, electronic amplifiers or any combinations of these. The electro-mechanical voltage regulating devices which are shown in Figures 1 and 4 may be substituted by transductor or transistor regulating devices without any change in the principle working of the invention. The invention is furthermore not limited to two phase generators but includes generators with any number of phases.

I claim:

1. N-phase self oscillating low frequency generator comprising $n$ direct current amplifiers, the number of direct current amplifiers ($n$) being at least two, means to feed to the input of each amplifier a combined signal comprising at least a part of the output of said amplifier for labile self-steering and a part of the output of at least one other amplifier in the generator for self-oscillations between the amplifiers, a measuring device measuring the vector sum of the outputs of the amplifiers, and means controlled by said measuring device for regulating the self-steering of the amplifiers to maintain a constant output amplitude.

2. N-phase self-oscillating low frequency generator according to claim 1, in which the dividers connected to the output of the amplifiers comprise impedances which also constitute the load of the generator.

3. N-phase self-oscillating low frequency generator according to claim 1, in which the direct current amplifiers comprise rotating direct current generators.

4. N-phase self oscillating low frequency generator comprising $n$ direct current amplifiers, the number of direct current amplifiers ($n$) being at least two, first means to feed to the input of each amplifier a part of the output voltage of said amplifier, said first feeding means including a first voltage divider connected to the output of the amplifier, second means to feed to the input of such amplifier a part of the output voltage of at least one other amplifier in the same generator, said second feeding means including a second voltage divider connected to the output of such other amplifier, a measuring device measuring the vector sum of the outputs of the amplifiers, and means controlled by said measuring device for regulating the self-steering of the amplifiers to maintain a constant output amplitude.

References Cited in the file of this patent

UNITED STATES PATENTS

| | | |
|---|---|---|
| 2,840,723 | Brown | June 24, 1958 |
| 2,853,628 | Pinney | Sept. 23, 1958 |